(12) United States Patent
Gutowski et al.

(10) Patent No.: US 8,653,183 B2
(45) Date of Patent: *Feb. 18, 2014

(54) METHOD OF CURING A COATING COMPOSITION COMPRISING A RADICAL CURABLE COMPOUND AND AN ORGANOBORANE-AMINE COMPLEX

(75) Inventors: Keith E. Gutowski, Clawson, MI (US); Walter H. Ohrbom, Hartland Township, MI (US); David Cranfill, Brighton, MI (US); Donald H. Campbell, Hartland, MI (US)

(73) Assignee: BASF SE (DE)

( * ) Notice: Subject to any disclaimer, the term of this patent is extended or adjusted under 35 U.S.C. 154(b) by 45 days.

This patent is subject to a terminal disclaimer.

(21) Appl. No.: 13/380,255

(22) PCT Filed: Jun. 22, 2010

(86) PCT No.: PCT/EP2010/058773
§ 371 (c)(1),
(2), (4) Date: Dec. 22, 2011

(87) PCT Pub. No.: WO2010/149637
PCT Pub. Date: Dec. 29, 2010

(65) Prior Publication Data
US 2012/0116013 A1 May 10, 2012

Related U.S. Application Data

(60) Provisional application No. 61/220,927, filed on Jun. 26, 2009.

(51) Int. Cl.
| C09D 7/12 | (2006.01) |
| B05D 7/24 | (2006.01) |
| B05D 3/10 | (2006.01) |
| C09D 4/02 | (2006.01) |
| C09D 133/08 | (2006.01) |

(52) U.S. Cl.
USPC ............ 524/560; 524/800; 524/832; 427/340

(58) Field of Classification Search
USPC ........................... 524/560, 800, 832; 427/340
See application file for complete search history.

(56) References Cited

U.S. PATENT DOCUMENTS

| 4,389,433 A | 6/1983 | Pampalone | |
| 5,144,032 A * | 9/1992 | Arduengo | 544/229 |
| 7,863,583 B2 | 1/2011 | Daiss et al. | |
| 2007/0196579 A1* | 8/2007 | Neckers et al. | 427/372.2 |
| 2008/0085983 A1* | 4/2008 | Ahn | 528/5 |
| 2008/0124532 A1 | 5/2008 | Menovcik et al. | |
| 2010/0022719 A1 | 1/2010 | Ohrbom | |
| 2010/0297355 A1 | 11/2010 | Cranfill et al. | |
| 2010/0298490 A1 | 11/2010 | Caiozzo et al. | |
| 2011/0135923 A1* | 6/2011 | Ahn et al. | 428/355 AC |
| 2011/0294919 A1 | 12/2011 | Merritt et al. | |
| 2012/0094027 A1* | 4/2012 | Cranfill et al. | 427/372.2 |
| 2012/0100293 A1* | 4/2012 | Gutowski et al. | 427/341 |
| 2012/0100378 A1* | 4/2012 | Ohrbom et al. | 428/412 |
| 2012/0116013 A1* | 5/2012 | Gutowski et al. | 524/560 |

FOREIGN PATENT DOCUMENTS

| DE | 102004030674 A1 | 1/2006 |
| EP | 0087969 A1 | 9/1983 |
| WO | WO-2005/000980 A2 | 1/2005 |
| WO | WO-2008/085234 A1 | 7/2008 |
| WO | WO-2010/149746 | 12/2010 |
| WO | WO 2010/149747 | 12/2010 |
| WO | WO-2010149637 A1 | 12/2010 |
| WO | WO-2010149733 A1 | 12/2010 |

OTHER PUBLICATIONS

U.S. Appl. No. 61/220,876.
U.S. Appl. No. 61/220,929.
International Search Report for PCT/EP2010/058773 mailed Sep. 13, 2010.
U.S. Appl. No. 13/380,281, filed Dec. 22, 2011, Cranfill et al.
U.S. Appl. No. 13/380,304, filed Dec. 22, 2011, Orhbom et al.
Cyril Ollivier et al., "Organoboranes as a Source of Radicals", Chem. Rev. vol. 101, pp. 3415-3434 (2001).
Vincent Darmency et al., "Tin-Free Radical Reactions Mediated by Organoboron Compounds", Top Curr chem vol. 263, pp. 71-106 (2006).
Mark F. Sonnenschein et al., "Mechanism of Trialkylborane Promoted Adhesion to Low Surface Energy Plastics", Macromolecules, vol. 37, pp. 7974-7978 (2004).
Mark F. Sonnenschein et al., "Physical and Chemical Probes of the Bond Strength between Trialkylboranes and Amines, and Their Utility as Stabilized Free Radical Polymerization Catalysts", Macromolecules, vol. 39, pp. 2507-2513, (2006).
Andrei V. Fedorov et al., "Remote Polymerization of Coatings with the Release of Borane from Its Amine Complex", Journal of Applied Polymer Science, vol. 107, pp. 147-152 (2008).

(Continued)

*Primary Examiner* — Liam Heincer
*Assistant Examiner* — Michael A Salvitti
(74) *Attorney, Agent, or Firm* — Novak Druce Connolly Bove + Quigg LLP

(57) ABSTRACT

A method of curing a coating composition and a method of forming a cured coating on an automobile component are provided. The coating composition comprises a radical polymerizable compound and an organoborane-amine complex having an organoborane initiator, an amine blocking agent, and water. The method of curing the coating composition comprises the steps of combining the organoborane-amine complex, the radical polymerizable compound, and water to form the coating composition. Carbon dioxide is introduced into the coating composition or into a composition including at least one of the organoborane-amine complex, the radical polymerizable compound, and water prior to forming the coating composition. Carbonic acid is formed in situ within the coating composition through reaction of the water and carbon dioxide. The organoborane-amine complex is decomplexed with the carbonic acid thereby separating the organoborane initiator and the amine blocking agent. The radical polymerizable compound is polymerized using the organoborane initiator in the presence of oxygen.

15 Claims, No Drawings

(56) References Cited

OTHER PUBLICATIONS

Andrei V. Fedorov, "New Method to Reduce Oxygen Surface Inhibition by Photorelease of Boranes from Borane/Amine Complexes", Macromolecules, vol. 40, pp. 3554-3560 (2007).
V. A. Bhanu et al., "Role of Oxygen in Polymerization Reactions", Chemical Reviews, vol. 91, No. 2, pp. 99-117 (1991).
Michael Caplow, "Kinetics of Carbamate Formation and Breakdown", J. Am. Chem. Soc., vol. 90:24, pp. 6795-6803 (1968).
P. V. Danckwerts, "The Reaction of $CO_2$ with Ethanolamines", Chemical Engineering Science, vol. 34, pp. 443-446 (1979).
John E. Crooks et al., "Kinetics and mechanism of the Reaction between Carbon Dioxide and Amines in Aqueous Solution", J. Chem. Soc. Perkin Trans. II (1989).
Eleanor D. Bates et al., "$CO_2$ Capture by a Task-Specific Ionic Liquid", J. Am. Chem. Soc. vol. 124, No. 6 (2002).
International Search Report of PCT/EP2010/059011 (Sep. 24, 2010).
International Search Report of PCT/EP2010/059009 (Sep. 24, 2010).
International Search Report of PCT/EP2010/059005 (Sep. 24, 2010).

* cited by examiner

METHOD OF CURING A COATING COMPOSITION COMPRISING A RADICAL CURABLE COMPOUND AND AN ORGANOBORANE-AMINE COMPLEX

CROSS-REFERENCE TO RELATED APPLICATIONS

This application is a national stage application (under 35 U.S.C. §371) of PCT/EP2010/058773, filed Jun. 22, 2010, which claims benefit of U.S. Provisional application 61/220,927, filed Jun. 26, 2009.

BACKGROUND OF THE INVENTION

1. Field of the Invention

The present invention generally relates to a method of curing a coating composition including a radical polymerizable compound and an organoborane-amine complex. More specifically, the invention relates to a method of forming in-situ a decomplexing agent for decomplexing the organoborane-amine complex and initiating polymerization of the radical polymerizable compound.

2. Description of the Related Art

Automotive finishing and refinishing is a growing industry in the United States and other countries due to an ever increasing number of vehicles being produced. Typically, original equipment manufacturing (OEM) automotive finish coatings and aftermarket refinish automotive coatings are formed from one-part or two-part compositions that require physical mixing of two condensed phases. This mixing typically limits control of curing, increases cure times, and makes application of the coating compositions to complex shapes and sequestered surfaces difficult.

As such, an interest in using quick cure technology, such as UV-cure and electron beam technology, has arisen in automotive finish and refinish coatings. These technologies utilize free electrons, whether as radicals formed by UV light or as electrons formed from electron beams, to polymerize and cure the coating compositions. These technologies minimize the curing times of the coating compositions as compared to differently cured solvent-based and water-based coating compositions but require expensive equipment such as UV lamps, vacuums, filaments, etc. Thus, use of these technologies is expensive, time consuming, and labor intensive, and may result in film shrinkage and oxygen surface inhibition.

Finish and refinish coatings requiring heat to cure typically employ use of large ovens that can accommodate entire automobiles or components thereof to initiate crosslinking. Typically, the coating compositions are applied to automobile components, which are then passed through the ovens to cure the coating compositions and thereby form the cured coatings. However, use of the ovens is very energy intensive, expensive, and has an adverse impact on the environment. In OEM automobile production facilities, the ovens occupy large footprints and are cumbersome to use.

Other technology has also been developed to improve the speed and efficiency with which the coating compositions are cured. This technology utilizes boron compounds, e.g. organoborane initiators, to form radicals that polymerize organic monomers and cure the coating compositions. Organoborane initiators initiate free radical polymerization in the coating compositions and promote adhesion of the resulting cured coatings to low surface energy substrates due to the ability of the organoborane initiators to generate radicals, which polymerize the organic monomers. Without intending to be bound by any particular theory, it is believed that diffusion limited oxidation of the organoborane initiators, and production of the radicals therefrom, is driven by the thermodynamic stability of boron-oxygen bonds in the organoborane initiator and causes the organoborane initiators to be pyrophoric in oxygen. Due to this reactivity, it is known to stabilize the organoborane initiators with blocking agents that render the organoborane initiators less susceptible to oxygen insertion and premature radical generation. The blocking agents are separated from the organoborane initiators under controlled conditions (e.g. with the application of heat or through exposure to a decomplexing agent) to release the organoborane initiators and initiate free radical formation via reaction with oxygen.

Even using the aforementioned technologies, coating compositions applied to complex shapes and surfaces or on multi-component parts are typically not able to cure effectively due to an inability of UV light to reach all portions of the coating compositions. Alternatively, some coating compositions cannot be exposed to UV light without suffering damage and thus also have a tendency to cure ineffectively. Still further, curing through use of UV light can be inhibited by oxygen at a surface of the applied coating composition. Such oxygen surface inhibition typically results in incomplete curing of the coating composition, leading to cured coatings that are tacky or lack scratch resistance.

As a result, technology has also been developed to alleviate oxygen surface inhibition. This technology includes use of gaseous atmospheres with UV light and irradiation of coating compositions in gaseous atmospheres. The gaseous atmospheres limit amounts of oxygen that are present during curing, thereby limiting oxygen surface inhibition. However, UV and radiation sources used in this type technology are typically disposed at great distances from the coating compositions such that incomplete curing is reduced but not eliminated. Since radiation sources typically emit large amounts of heat, it is difficult to bring the radiation sources within the gaseous atmospheres and shorten the distances between the radiation sources and the coating compositions to be cured. The heat from the radiation sources causes strong vortexing in the gaseous atmospheres and contaminates the atmospheres with oxygen, thus negating the benefits of using this technology.

One derivative of this technology utilizes organoborane-amine complexes and gaseous initiating agents to effect curing. As is known in the art, and as alluded to above, blocking agents may be separated or decomplexed from the organoborane initiators in the organoborane complex through exposure to a decomplexing agent to release the organoborane initiators and initiate free radical formation. The radicals initiate polymerization and curing of the coating compositions. The most common decomplexing agents are acids, aldehydes, ketones, isocyanates, and anhydrides. The decomplexing agents can be used in gaseous form to initiate cure of coating compositions. Although effective in coating compositions on small scales, existing techniques employing such technology cannot be effectively scaled up and used in large scale OEM production facilities due to the cost and toxicity of the decomplexing agents. For example, many of the aforementioned decomplexing agents such as acetaldehyde, formaldehyde, isocyanates, maleic anhydride, methyl (ethyl) ketones, phthalic anhydride, and propionaldehyde are classified by the Environmental Protection Agency as hazardous air pollutants (HAPs). Accordingly, their use is severely restricted in large production facilities and is not environmentally friendly. Furthermore, many acids that are known for use as decomplexing agents are detrimental to properties of the cured coating and/or underlying substrates due to corrosive properties thereof, and the presence of the acids in the cured coating may be detrimental to the properties of the cured coating and/or the underlying substrates.

Accordingly, there remains an opportunity to develop an improved method of curing coating compositions that may be performed in the absence of external heating, UV light, peroxides, or azonitrile initiators and that can be used with complex shapes and sequestered surfaces. There also remains an opportunity to develop such a method that is environmentally friendly and useable in large production facilities with minimal emissions and pollution. There also remains an opportunity to develop such a method that reduces or eliminates the presence of acids in the cured coating that may be detrimental to the properties of the cured coating and/or underlying substrates.

SUMMARY OF THE INVENTION AND ADVANTAGES

The subject invention provides a method of curing a coating composition and a method of forming a cured coating on an automobile component. The coating composition comprises a radical polymerizable compound, an organoborane-amine complex having an organoborane initiator and an amine blocking agent, and water. The method of curing the coating composition comprises the steps of combining the organoborane-amine complex, the radical polymerizable compound, and water to form the coating composition. Carbon dioxide is introduced into the coating composition or into a composition including at least one of the organoborane-amine complex, the radical polymerizable compound, and water prior to forming the coating composition. The carbon dioxide is present in the coating composition in a molar ratio of at least 500:1 with the amine blocking agent of the organoborane-amine complex. Carbonic acid is formed in situ within the coating composition in a predetermined amount based upon temperature of the coating composition and/or pressure of an atmosphere surrounding the coating composition. The organoborane-amine complex is decomplexed with the carbonic acid thereby separating the organoborane initiator and the amine blocking agent. The radical polymerizable compound is polymerized using the organoborane initiator in the presence of oxygen.

The carbon dioxide used in the instant method is non-toxic and is not classified as a hazardous air pollutant, thus making this method environmentally friendly and allowing this method to be utilized in large production facilities with minimal emissions and pollution. In addition, the carbon dioxide is inexpensive and is readily available from recycling efforts designed to reduce greenhouse gasses and environmental pollution. In addition, use of the carbon dioxide minimizes oxygen surface inhibition of curing thereby increasing the efficiency of this method. Moreover, use of the carbon dioxide improves control of curing rate and allows for use of one-component (1K) systems that reduce cure times. Still further, the carbon dioxide used in this method can be reclaimed from this method through a thermally reversible reaction, thereby further reducing emissions and pollution.

In addition, carbon dioxide has a very low hydration equilibrium constant, with the amount of carbonic acid present in the coating composition dependent upon the amount of carbon dioxide present therein. Reductions in the amount of carbon dioxide in the coating composition result in reductions in the amount of carbonic acid present therein. The amount of carbonic acid present in the coating composition may also be varied based upon temperatures and pressures to which the coating composition is exposed. As such, it is possible to reduce or eliminate the presence of carbonic acid in the cured coating once the organoborane-amine complex is decomplexed. In this manner, harmful affects associated with known acids that are used as decomplexing agents can be avoided or minimized.

DETAILED DESCRIPTION OF THE INVENTION

The present invention provides a method of curing a coating composition comprising a radical polymerizable compound, an organoborane-amine complex including an organoborane initiator and an amine blocking agent, and water. Curing is accomplished via in-situ formation of carbonic acid in the coating composition to decomplex the organoborane-amine complex, thereby separating the organoborane initiator and the amine blocking agent. The radical polymerizable compound is polymerized using the organoborane initiator in the presence of oxygen. The organoborane-amine complex, the carbonic acid and manner in which the carbonic acid is formed, and the radical polymerizable compound are described in greater detail below.

The coating composition may be any composition that includes the radical polymerizable compound, the organoborane-amine complex, and water, and the coating composition is not limited to any particular application in any particular industry. The coating composition may be used in a variety of applications including, but not limited to, original equipment manufacturing (OEM) "finish" coatings, aftermarket "refinish" coatings, automotive coatings, protective coatings, films, encapsulants, gels, sealants, release coatings, conformal coatings, and combinations thereof. Typically, the coating composition is used as an automotive OEM finish coating or as an automotive refinish coating as a primer, basecoat, clearcoat, and/or sealant.

The coating composition may be water-borne or solvent-borne and may be used as a one component (1K) or two component (2K) system. Typically, the composition is solvent-borne and is a 1K system. The coating composition is typically applied to a substrate and cured to form a cured coating. For example, the coating composition that is a 2K system includes two components that are reactive with each other, e.g. one component may include the radical polymerizable compound as set forth above and another component may include a cross-linking agent or other compound without which curing the 2K system could not be adequately achieved. Alternatively, the coating composition that is a 1K system includes the radical polymerizable compound, with adequate curing achieve in the absence of mixing with a second component as is required in 2K systems. Of course, it is to be appreciated that the coating composition that is a 1K system may include more than one radical polymerizable compound, and may include a cross-linking agent and/or catalyst. In still other embodiments, the 1K and/or 2K systems may include hindered amine light stabilizers (HALS), UVA packages, flow additives, wetting agents, pigments, cross-linkers, catalysts, and the like.

As first introduced above, the radical polymerizable compound is present in the coating composition. The radical polymerizable compound typically includes one or more ethylenically unsaturated groups per molecule, i.e., C=C groups. It is contemplated that the radical polymerizable compound may include two ethylenically unsaturated groups or three or more ethylenically unsaturated groups. As is well known in the art, ethylenically unsaturated groups are electrophilic and can donate electrons in a process of polymerization. The radical polymerizable compound may also include one or more alkynyl groups, i.e., C≡C groups. The radical polymerizable compound may be selected from the group of monomers, dimers, oligomers, pre-polymers, polymers, co-polymers, block polymers, star polymers, graft polymers, random co-polymers, and combinations thereof, so long as the radical polymerizable compound is still able to be radically polymerized. In one embodiment, the radical polymerizable compound is a monomer. In another embodiment, the radical polymerizable compound is partially polymerized and is an oligomer or a polymer, but still retains an ability to be further polymerized. In a further embodiment, the radical polymerizable compound is selected from the group of mono- and poly-unsaturated glycerols or phospholipids, phosphor diesters, peptides, nucleosides, nucleotides, and combinations thereof, having at least one radically polymerizable functional group.

In still a further embodiment, the radical polymerizable compound is selected from the group of acrylates, carbamates, epoxides, and combinations thereof. Suitable non-limiting examples of carbamates and epoxides are those having at least one radically polymerizable functional group and typically one or more functional groups selected from the group of esters, ethers, ketones, aldehydes, carboxylic acids, amides and ureas, acrylics, sulfur groups, phosphorous groups, and combinations thereof. The carbamates may include aliphatic, cycloaliphatic, and aromatic groups and may have linear or branched structures with various functionalities including, but not limited to, branched hydrocarbon functionality, hydroxyl functionality, carboxylate functionality, carbamate functionality, and/or ester functionality. In a further embodiment, the radical polymerizable compound is selected from the group of $\alpha,\beta$-unsaturated aliphatic compounds, vinyl esters, substituted styrenes, esters of methacrylic acid, esters of acrylic acid, and combinations thereof. Examples of suitable $\alpha,\beta$-unsaturated aliphatic compounds include, but are not limited to, 1-octene, 1-hexene, 1-decene, and combinations thereof. Non-limiting examples of suitable vinyl esters and styrenes include vinyl acetate, styrene, $\alpha$-methylstyrene, p-methylstyrene, and combinations thereof.

In other embodiments, the radical polymerizable compound is selected from the group of acrylates, halogen substituted acrylates, alkenoates, carbonates, phthalates, acetates, itaconates, and combinations thereof. Suitable examples of acrylates include, but are not limited to, butyl acrylate, t-butyl acrylate, isobornyl acrylate, isodecyl acrylate, 2-ethylhexyl acrylate, lauryl acrylate, cyclohexyl acrylate, octyl acrylate, isocyanate containing acrylates such as isocyanatoacrylate, and combinations thereof. In additional embodiments, the radical polymerizable compound is selected from the group of diacrylates, triacrylates, polyacrylates, urethane acrylates, unsaturated polyesters, and combinations thereof. Suitable examples of di-, tri-, and poly-acrylates include, but are not limited to, hexanediol diacrylate, tripropyleneglycol diacrylate, trimethylolpropane triacrylate, alkoxylated trimethylolpropane triacrylate, pentaerythritol triacrylate, pentaerythritol tetraacrylate, dipentaerythritol hexaacrylate, and combinations thereof. Suitable non-limiting examples of urethane acrylates include Ebercryl 8402 and Ebercryl 8301 commercially available from UCB Chemicals and Actilane 251, commercially available from Akcros Chemicals. Suitable non-limiting examples of unsaturated polyesters include polyesters prepared with maleic anhydride. In an additional embodiment, the radical polymerizable compound is further defined as a mixture of an OH-acrylic resin and a dipentaerythritol penta/hexa acrylate. In yet another embodiment, the radical polymerizable compound is selected from the group of unsaturated acrylic and methacrylic ester resins, functional acrylic and methacrylic ester monomers, and combinations thereof.

In still other embodiments, the radical polymerizable compound is selected from the group of butyleneglycol diacrylate, butylene glycol dimethylacrylate, 2-ethylhexylacrylate, 2-ethylhexylmethacrylate, 2-hydroxyethylacrylate, 2-hydroxyethyl methacrylate, methylacrylate, methylmethacrylate, neopentylglycol diacrylate, neopentylglycol dimethacrylate, glycidyl acrylate, glycidyl methacrylate, allyl acrylate, allyl methacrylate, stearyl acrylate, stearyl methacrylate, tetrahydrofurfuryl acrylate, tetrahydrofurfuryl methacrylate, caprolactone acrylate, perfluorobutyl acrylate, perfluorobutyl methacrylate, 1H,1H,2H,2H-heptadecafluorodecyl acrylate, 1H,1H,2H,2H-heptadecafluorodecyl methacrylate, tetrahydroperfluoroacrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, diethyleneglycol diacrylate, diethyleneglycol dimethacrylate, dipropyleneglycol diacrylate, dipropyleneglycol dimethacrylate, polyethyleneglycol diacrylate, polyethyleneglycol dimethacrylate, polypropyleneglycol diacrylate, polypropyleneglycol dimethacrylate, trimethylolpropane triacrylate, trimethylolpropane trimethacrylate, ethoxylated trimethylolpropane triacrylate, ethoxylated trimethylolpropane trimethacrylate, pentaerythritol triacrylate, pentaerythritol trimethacrylate, pentaerythritol tetraacrylate, pentaerythritol tetramethacrylate, and combinations thereof. Other examples of suitable acrylates include acrylamides and methacrylamides such as N-isopropyl acrylamide and N,N-dimethylacrylamide. In one embodiment, the radical polymerizable compound is selected from the group of alkylene glycol dialkylacrylate, alkylene glycol diacrylate, and combinations thereof. Most typically, the radical polymerizable compound is an acrylate or methacrylate.

Suitable examples of alkenoates include, but are not limited to, alkyl-N-alkenoates, methyl-3-butenoate, and combinations thereof. Suitable examples of carbonates include, but are not limited to, alkyl carbonates, allyl alkyl carbonates such as allyl methyl carbonate, diallyl pyrocarbonate, diallyl carbonate, and combinations thereof. Suitable itaconates for use in the present invention include, but are not limited to, alkyl itaconates such as dimethyl itaconate.

Non-limiting examples of suitable acetates include alkyl acetates, allyl acetates, allyl acetoacetates, and combinations thereof. Non-limiting of examples of phthalates include, but are not limited to, allyl phthalates, diallyl phthalates, and combinations thereof.

The radical polymerizable compound may also include styrene and substituted styrenes, particularly when used in conjunction with acrylic monomers. The radical polymerizable compound may alternatively include acrylate tipped polyurethane prepolymers prepared by reacting isocyanate reactive acrylate monomers, oligomers or polymers, such as hydroxy acrylates, with isocyanate functional prepolymers. Also useful are a class of conductive monomers, dopants, oligomers, polymers, and macromonomers having an average of at least one free radical polymerizable group per molecule, and the ability to transport electrons, ions, holes, and/or phonons. Non-limiting examples include, but are not limited to, 4,4'4"-tris[N-(3(2-acryloyloxyethyloxy)phenyl)-N-phenylamino]triphenylamine, and 4,4'4"-tris[N-(3(benzoyloxyphenyl)-N-phenylamino]triphenylamine.

It is also contemplated that the radical polymerizable compound may include compounds including acryloxyalkyl groups such as an acryloxypropyl group, methacryloxyalkyl groups such as a methacryloxypropyl group, and/or unsaturated organic groups including, but not limited to, alkenyl groups having 2-12 carbon atoms including vinyl, allyl, butenyl, and hexenyl groups, alkynyl groups having 2-12 carbon atoms including ethynyl, propynyl, and butynyl groups, and combinations thereof. The unsaturated organic groups may include radical polymerizable groups in oligomeric and/or polymeric polyethers including an allyloxypoly(oxyalkylene) group, halogen substituted analogs thereof, and combinations thereof. In another embodiment, the radical polymerizable compound includes a compound formed by copolymerizing organic compounds having polymeric backbones with the radical polymerizable compound such that there is an average of at least one free radical polymerizable group per copolymer. Suitable organic compounds include, but are not limited to, hydrocarbon based polymers such as polyisobutylene, polybutadienes, polyisoprenes, polyolefins such as polyethylene, polypropylene and polyethylene polypropylene copolymers, polystyrenes, styrene butadiene, and acrylonitrile butadiene styrene, polyacrylates, polyethers such as polyethylene oxide and polypropyleneoxide, polyesters such as polyethylene terephthalate and polybutylene terephthalate, polyamides, polycarbonates, polyimides, polyureas, polymethacrylates, partially fluorinated or perfluorinated polymers such as polytetrafluoroethylene, fluorinated rubbers, terminally unsaturated hydrocarbons, olefins, polyolefins, and combinations thereof. Of course, it is to be understood that the radical polymerizable compound is not limited to the aforementioned compounds and may include any others known in the art.

It is to be appreciated that the coating composition may include a combination of more than one of any of the aforementioned radical polymerizable compounds. In various embodiments, the radical polymerizable compound is typically present in the coating composition in an amount of from 20 to 99, alternatively in an amount of from 50 to 99, alternatively in an amount of from 60 to 99, alternatively in an amount of from 80 to 99, percent by weight based on the total weight of the coating composition. In another embodiment, the radical polymerizable compound is present in an amount of from 50 to 80 parts by weight per 100 parts by weight of the composition. In this embodiment, 20 parts by weight of the composition typically includes a solvent. It is to be appreciated that when more than one radical polymerizable compound is present in the coating composition, the amounts set forth above may represent the total amount of all radical polymerizable compounds present in the coating composition.

Referring back to organoborane-amine complex, the instant invention is directed towards decomplexing the organoborane-amine complex in the coating composition. As briefly described above, the organoborane-amine complex has the organoborane initiator and the amine blocking agent. More specifically, the organoborane-amine complex may be further defined as a complex formed between the organoborane initiator (i.e., an organoborane ($R_3B$)) and a suitable amine blocking agent. The amine blocking agent renders the organoborane-amine complex stable at ambient conditions and in a variety of solutions of radical polymerizable compounds, as well as in the presence of oxygen, so as to inhibit premature polymerization of the radical polymerizable compound through exposure to the organoborane initiator in the presence of oxygen.

The organoborane initiator typically includes tri-functional boranes which have the general structure:

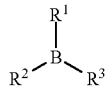

wherein each of $R^1$-$R^3$ independently has 1 to 20 carbon atoms and wherein each of $R^1$-$R^3$ independently include one of a hydrogen atom, a cycloalkyl group, a linear or branched alkyl group having from 1 to 12 carbon atoms in a backbone, an aliphatic group, and aromatic group, an alkylaryl group, an alkylene group capable of functioning as a covalent bridge to the boron, and halogen substituted homologues thereof, such that at least one of $R^1$, $R^2$, and $R^3$ includes one or more carbon atoms, and is covalently bonded to boron. Up to two of $R^1$-$R^3$ may also independently be an alkoxy group such as a methoxy or ethoxy group such that at least one of $R^1$-$R^3$ provides a boron-carbon covalent bond. The aliphatic and/or aromatic hydrocarbon groups may be linear, branched, and/or cyclic. The organoborane initiator may be further defined as, but is not limited to, tri-methylborane, tri-ethylborane, tri-n-butylborane, tri-n-octylborane, tri-sec-butylborane, tri-dodecylborane, phenyldiethylborane, and combinations thereof. Other suitable examples include 9-BBN in a 0.5M solution as monomer 9-borabicyclo[3.3.1]nonane in hexanes, 9-BBN in a 0.5M solution as monomer 9-borabicyclo[3.3.1]nonane in tetrahydrofuran, 9-BBN in a 0.5M solution as monomer 9-borabicyclo[3.3.1]nonane in toluene, dibutylboron triflate (DBBT) in a 0.5M solution in n-heptane, dibutylboron triflate (DBBT) in a 0.5M solution in methylene chloride, dibutylboron triflate (DBBT) in a 0.5M solution in toluene, dicyclohexylboron triflate (DCBT) in a 0.5M solution in hexanes, dicyclohexylchloroborane (DCBCL) in a 1M solution in hexanes, methoxydiethylborane (MDEB) as a neat liquid, a 50 wt % solution of methoxydiethylborane (MDEB) in tetrahydrofuran, triethylborane (TEB) as a neat liquid, triethylborane (TEB) as a neat liquid in tetrahydrofuran, triethylborane (TEB) in a 1M solution in hexanes, tri-n-butylborane (TNBB) as a neat liquid, tri-sec-butylborane (TSBB) as a neat liquid. Typically, the organoborane is further defined as tri-n-butylborane. For descriptive purposes only, the structure of tri-n-butylborane is set forth below:

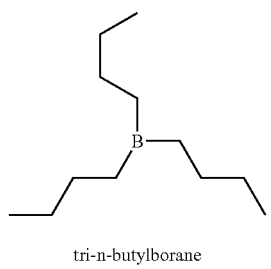

tri-n-butylborane

The organoborane initiator can be synthesized by well known hydroboration techniques. One route of synthesis includes reaction of diethylborane in THF with terminally alkenic compounds. It is known that such reactions generally can produce a mixture of products derived from the addition of boron to either the α-penultimate position or the β-terminal position of the carbon of the double bond. It is to be understood that a β-product, or a mixture of α- and β-products, may also be included in the organoborane initiator.

The amine blocking agent may be any such agent known in the art to form organoborane-amine complexes. Typically, the amine blocking agent includes at least one of an alkyl group, an alkoxy group, an amidine group, an ureido group, and combinations thereof. In one embodiment, the amine is a diamine. In another embodiment, the amine is a monoamine. Particularly suitable amine blocking agents include, but are not limited to, 1,3 propane diamine, 1,6-hexanediamine, methoxypropylamine, pyridine, isophorone diamine, amine functional compounds including at least one amine functional group such as 3-aminopropyl, 6-aminohexyl, 11-aminoundecyl, 3-(N-allylamino)propyl, N-(2-aminoethyl)-3-aminopropyl, aminomethyl, N-(2-aminoethyl)-3-aminoisobutyl, p-aminophenyl, 2-ethylpyridine, and combinations thereof. In various embodiments, the amine is selected from the group of propylamine, hexylamine, benzylamine, heptylamine, methoxypropylamine, 2-methyl amino ethanol, cysteamine, and combinations thereof. However, it is to be appreciated that the instant invention is not limited to any particular amine to form the organoborane-amine complex.

Referring back to the organoborane-amine complex itself, the instant invention can utilize any organoborane-amine complex known in the art and is not limited to those embodiments described above or set forth below. In various embodiments, the organoborane-amine complex is formed from dialkylboranes, trialkylboranes, and the like. Moreover, the organoborane initiator may be complexed with the amine and simultaneously bonded to another atom and/or blocking group. These other atoms and/or blocking groups may be any known in the art including carbon compounds, halogenated compounds, transition metal compounds, and the like.

The organoborane-amine complex typically has the formula:

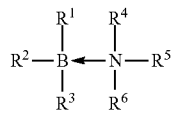

wherein B represents boron and each of $R^1$-$R^3$ may be the same as described above. Similarly, each of $R^4$-$R^6$ may be any group such that the amine is any described above and is a primary, secondary, or tertiary amine. In one alternative embodiment, each of $R^1$-$R^6$ is independently selected from the group of a hydrogen atom, an alkyl group, an alkoxy group, an arylalkyl group, an alkylene group, halogenated homologs thereof, and combinations thereof. Alternatively, each of $R^4$-$R^6$ may independently be nitrogen and/or sulfur functional. In various embodiments, $R^4$-$R^6$ are diamine functional. In still other embodiments, the organoborane-amine complex has the formula:

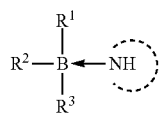

wherein each of $R^1$-$R^3$ is as described above and wherein the amine is further defined as a cyclic amine.

Suitable non-limiting examples of the organoborane-amine complex include N,N-diethyl aniline borane (DEANB) as a neat liquid, pyridine borane (PYB) as a neat liquid, a 50 wt % solution pyridine borane (PYB) in pyridine, tert-butylamine borane (TBAB) as a powder, triethylamine borane (TEAB) as a neat liquid, triethylborane-1,3-diaminopropane complex (TEB-DAP) as a neat liquid, trimethylamine borane (TMAB) as a powder, tri-n-butylborane diaminopropane (TnBB-DAP), and combinations thereof. An additional suitable example of the organoborane-amine complex is triethylborane complexed with diisopropylamine. An additional suitable example of the organoborane-amine complex has the following formula: $R_3BH_2NCH_2CH_2CH_2NH_2BR_3$, wherein each R may independently have 1 to 20 carbon atoms, may independently be a hydrogen atom, a cycloalkyl group, a linear or branched alkyl group having from 1 to 12 carbon atoms in a backbone, an aliphatic group, and aromatic group, an alkylaryl group, an alkylene group capable of functioning as a covalent bridge to the boron, and halogen substituted homologues thereof. In one embodiment, the organoborane-amine complex is a monoamine complex, and may be selected from the organoborane-amine complexes set forth above. It is to be appreciated that the organoborane-amine complexes set forth above can be used to act in concerted fashion with other organoborane-amine complexes that act through different decomplexing mechanisms than are described herein.

The organoborane-amine complex may be physically and/or chemically attached (bound) to a solid particle such as a phase support to control working times, as well as to stabilize liquid phase organoborane-amine complexes against separating during storage. Attachment can be accomplished by a number of known substrate treatments either in-situ or a priori. If the solid particles include functional groups, additives such as substrate treating agents or impurities that are inherently amine-reactive, may require appropriate pre-cautions to avoid premature decomplexation of the organoborane-amine complex being attached. Solid particles including amine-reactive substances can be purified or neutralized before attachment of the organoborane-amine complex. Alternatively, the attachment of the organoborane-amine complex may be performed in an oxygen free environment.

The organoborane-amine complex may be used in any amount to form the coating composition. Typically, the organoborane-amine complex is used in an amount equivalent to from 0.01 to 95, more typically from 0.1 to 80, even more typically from 0.1 to 30, still more typically from 1 to 20, even more typically from 1 to 15, and most typically from 2 to 5 percent by weight based on the total weight of the coating composition. The amounts of the organoborane-amine complex depend upon a molecular weight and functionality of the organoborane-amine complex and the presence of other components in the coating composition such as fillers.

The organoborane-amine complex is decomplexed with carbonic acid, as described in greater detail below, to separate the organoborane initiator and the amine blocking agent. The organoborane initiator is capable of initiating polymerization or cross-linking of the radical polymerizable compound. Without intending to be limited by any particular theory, it is believed that tri-substituted boranes, in the presence of triplet oxygen, can undergo bi-molecular homolytic cleavage at a boron-carbon bond to yield corresponding peroxyl, alkoxyl, ketone triplet, and/or thiyl (also known as sulfenyl) radicals. These radicals may propagate by reacting with additional organoborane initiators until termination at a trialkyl borate. Decomplexing of the organoborane-amine complex is described in further detail below.

In various embodiments, the organoborane-amine complex is used for radical polymerization and chain transfers. In various embodiments, the organoborane-amine complex is used to polymerize the radical polymerizable compound to form dimers, oligomers, pre-polymers, polymers, co-polymers, block polymers, star polymers, graft polymers, random co-polymers, and/or combinations thereof that may or may not remain able to be further radically polymerized.

The coating composition further includes water, which is used to form carbonic acid (among other possible acids) in the coating composition as described in further detail below. The water is typically present in the coating composition in a molar ratio of at least 112:1 with carbon dioxide present in the coating composition, as described in further detail below. More typically, the water is present in a molar ratio in excess of 112:1 with the carbon dioxide present in the coating composition. Carbonic acid present in the coating composition is stabilized with water such that greater amounts of water in the coating composition correlate to greater stabilization of the carbonic acid, with amounts of water below a molar ratio of 112:1 with the carbon dioxide present in the coating composition providing insufficient stabilization of the carbonic acid for purposes of the instant invention.

In addition to the aforementioned compounds, the coating composition may also include one or more additives. The one or more additives may be selected from the group consisting of leveling agents, solvents, surfactants, fillers, stabilizers, solvents, plasticizers, defoaming agents, wetting additives, catalysts, rheology controlling agents, pigments, photosynergists, adhesion promoters, pigment dispersants, flow aids, acid functional polymers, additive polymers, catalysts, and combinations thereof. Non-limiting examples of suitable surfactants include Surfynol® Surfactants commercially available from Air Products and Chemicals, Inc. of Allentown, Pa. Suitable non-limiting examples of plasticizers include Coroc® Acrylic Plasticizer Resins commercially available from Cook Composites and Polymers of St. Louis, Mo.

The one or more additives may also include a catalyst to enhance curing, although the coating composition is preferably free of catalysts. When catalysts are used, examples of suitable catalysts, which are well-known in the art, include, but are not limited to, p-toluenesulfonic acid, dinonylnaphthalene disulfonic acid, dodecylbenzene sulfonic acid, phenyl acid phosphate, monobutyl maleate, butyl phosphate, hydroxy phosphate ester, and combinations thereof. Other catalysts that may be useful in the coating composition include, but are not limited to, Lewis acids, transition metal salts such as zinc salts and tin salts, and combinations thereof. The catalyst may be blocked, unblocked, or partially blocked. The catalyst may be blocked or partially blocked with an amine or other suitable blocking agent such as an oxirane modifying material. If included, the catalyst is preferably included in an amount of 0.1 to 1.2, more preferably of 0.1 to 0.9, and most preferably of 0.2 to 0.7, percent by weight based on the total weight of the coating composition.

In addition to the water included in the coating composition as described above, the coating composition may include an additional solvent as the one or more additives. Suitable additional solvents may be any known in the art. In one embodiment, the additional solvent includes a polar organic solvent. In another embodiment, the additional solvent includes a polar aliphatic solvent. In an additional embodiment, the additional solvent includes a polar aromatic solvent. In yet another embodiment, the additional solvent is selected from the group of a ketone, an ester, an acetate, an aprotic amide, an aprotic sulfoxide, an aprotic amine, and combinations thereof. Non-limiting examples of useful additional solvents include methyl ethyl ketone, methyl propyl ketone, methyl isobutyl ketone, m-amyl acetate, ethylene glycol butyl ether-acetate, propylene glycol monomethyl ether acetate, xylene, N-methylpyrrolidone, 2-ethylhexanol, n-butanol, dipropylene glycol methyl ether, SC 150 solvent commercially available from ExxonMobil of Irving, Tex., naptha, heavy benzene, ethyl ethoxypropionate, butylglycol acetate, butylglycol, blends of aromatic hydrocarbons such as Aromatic 100, butyl alcohol, ethyl acetate, butyl acetate, butyl alcohol, propylene glycol monomethyl ether acetate, dipropylene glycol propyl ether, mineral spirits, 2-butoxy ethanol, dipropylene glycol monomethyl ether, dibutyl ether, 2-ethylhexanol, and combinations thereof. If included, the additional solvent is typically included in an amount of up to 60, more typically in an amount of from 5 to 50, and most typically in an amount of from 10 to 40, percent by weight based on the total weight of the coating composition.

Further, the one or more additives may include a pigment. When, for example, the coating composition is used as a basecoat, the pigment may include organic and/or inorganic compounds, colored materials, fillers, metallic and/or inorganic flake materials such as mica or aluminum flake, and combinations thereof. Non-limiting examples of suitable pigments include a carbon black pigment, titanium dioxide and other inorganic colored pigments, such as iron oxide, chrome yellow, moly orange, titanium yellow, nickel titanate yellow, chrome greens, and the like. If included, the pigment is typically included in an amount of up to 60, more typically in an amount of from 5 to 50, and most typically in an amount of from 10 to 40, percent by weight based on the total weight of the coating composition.

Still further, the one or more additives may include a leveling agent. The leveling agent may include, but is not limited to, vinyl acrylic copolymers, and the like. If included, the leveling agent is typically included in an amount of up to 20, more typically in an amount of from 1 to 10, and most typically in an amount of from 2 to 5, percent by weight based on the total weight of the coating composition.

Alternatively, the one or more additives may include a stabilizer. The stabilizer may include hindered amine light stabilizers (HALs). If included, the HALs may include any known in the art. Preferably, if included, the HALs have a molecular weight of less than 300 g/mol and more preferably of less than 260 g/mol. Illustrative examples of commercially available HALs that are suitable for use in the present invention include, but are not limited to, Sanduvor® 3058 commercially available from Sandoz LTD. Corporation of Basel, Switzerland, and Tinuvin® 123, 292, and 384 commercially available from Ciba-Geigy Corporation of Ardsley, N.Y. If included, the stabilizer is typically included in an amount of up to 20, more typically in an amount of from 1 to 10, and most typically in an amount of from 2 to 5, percent by weight based on the total weight of the coating composition.

Referring back to the method itself, the method includes the step of combining the organoborane-amine complex, the radical polymerizable compound, and the water to form the coating composition. The organoborane-amine complex, the radical polymerizable compound, and the water may be combined in any manner. For example, the coating composition may be applied onto a substrate, such as an automobile component. The organoborane-amine complex, the radical polymerizable compound, and water may be applied onto the substrate separately, together, or in various combinations. Further, the source of the organoborane-amine complex, the radical polymerizable compound, and water may be different. For example the water may be present on the substrate itself, whereas the organoborane-amine complex and the radical polymerizable compound may be sprayed onto the substrate. As an example of separate application of the components of the coating composition on the substrate, a layer containing the organoborane-amine complex and the radical polymerizable compound may be applied onto the substrate, followed by application of another composition that contains the water onto the layer containing the organoborane-amine complex and the radical polymerizable compound. Suitable application methods include, but are not limited to, spray coating, dip coating, roll coating, curtain coating, electrostatic spraying, and combinations thereof. In one embodiment, the organoborane-amine complex, the radical polymerizable compound, and water are first combined together and applied to the substrate. Alternatively, the organoborane-amine complex, the radical polymerizable compound, and water may be combined at a nozzle of an impingement spray gun.

In one embodiment, the substrate may be further defined as a reactor and/or a vessel. The reactor and/or vessel may be laboratory or industrial sized. Typically, when the substrate is further defined as the reactor and/or vessel, the radical polymerizable compound is polymerized in the reactor or vessel. Once formed, the polymerized compound can then be further used as selected by one of skill in the art. In one embodiment, the polymerized compound is applied to an automobile component after being formed in the reactor.

Alternatively, as set forth above, the substrate may be further defined as the automobile component itself. The automobile component may be a door, hood, roof, panel, etc., and the like. In this embodiment, the method typically includes forming the coating composition, and polymerizing the radical polymerizable compound, on the automobile component and not in the vessel or reactor. However, as described above, the method is not limited to such an embodiment.

Relative to materials from which the substrate may be formed, in one embodiment, the substrate is a sheet of organic or inorganic material such as carbon fiber, steel, aluminum, and the like. The substrate may be coated or uncoated, treated or untreated, and combinations of these. In various embodiments, the substrate is selected from the group of plastic, metals such as steel, iron, and aluminum, and combinations thereof. Alternatively, the substrate may include steel and/or extruded automobile components. In various embodiments, the substrate may be pre-coated with other layers such as a primer and/or electrocoat layer.

In the method of this invention, carbon dioxide is introduced into the coating composition or into a composition including at least one of the organoborane-amine complex, the radical polymerizable compound, and water prior to forming the coating composition. The carbon dioxide reacts with water to form in-situ carbonic acid in the coating composition or in the composition including at least one of the organoborane-amine complex, the radical polymerizable compound, and water prior to forming the coating composition. The terminology "in-situ" refers to forming the carbonic acid in the coating composition or in a composition including at least one of the organoborane-amine complex, the radical polymerizable compound, and water prior to forming the coating composition.

The carbon dioxide can be introduced into the coating composition after the organoborane-amine complex, the radical polymerizable compound, and water are already combined. Alternatively, the step of combining the organoborane-amine complex, the radical polymerizable compound, and water occurs simultaneously with the step of introducing the carbon dioxide. Alternatively still, the carbon dioxide can be introduced into at least one of the organoborane-amine complex, the radical polymerizable compound, and water prior to forming the coating composition such that when these compounds are combined, the carbon dioxide is then introduced into the coating composition.

The step of introducing the carbon dioxide may be further defined as exposing the coating composition to a controlled gaseous atmosphere containing carbon dioxide present in a concentration greater than concentration of carbon dioxide in ambient atmospheric air, provided that the controlled gaseous atmosphere has oxygen present therein in an amount greater than 0 percent by weight, typically from 0.1 to 5.0 percent by weight, based on the total weight of the controlled gaseous atmosphere at a temperature of about 25° C. In this embodiment, the carbon dioxide is allowed to permeate into the coating composition from the controlled gaseous atmosphere. Typically, the carbon dioxide is present in the controlled gaseous atmosphere in an amount of at least 50 percent by weight, alternatively from 50 to 99 percent by weight, alternatively from 90 to 99 percent by weight based on the total weight of the controlled gaseous atmosphere at a temperature of about 25° C. It is to be appreciated that the amounts of carbon dioxide present in the controlled gaseous atmosphere may be varied depending upon the total amount of carbon dioxide to be introduced into the coating composition, and based upon other factors such as temperature and pressure of the controlled gaseous atmosphere and the coating composition. The controlled gaseous atmosphere including the carbon dioxide may be accommodated in a gas sink as described in the patent application entitled "System and Method for Curing a Composition", filed on the same day herewith, having the Ser. No. 61/220,929. However, it is to be appreciated that any manner of forming and accommodating the controlled gaseous atmosphere may be used.

Alternatively, the step of introducing the carbon dioxide may be further defined as injecting the carbon dioxide into the coating composition or into the composition including at least one of the organoborane-amine complex, the radical polymerizable compound, and water prior to forming the coating composition, spraying the carbon dioxide over the coating composition on the substrate, or combinations thereof. In one embodiment, the step of introducing the carbon dioxide is further defined as spraying the carbon dioxide from a nozzle of a spray gun such as an impingement spray gun. The nozzle and the impingement spray gun may be any known in the art.

The carbon dioxide used in this invention is typically gaseous but may be a supercritical fluid. For example, in one embodiment, the step of introducing the carbon dioxide is further defined as introducing supercritical carbon dioxide into the coating composition or into the composition including at least one of the organoborane-amine complex, the radical polymerizable compound, and water prior to forming the coating composition. In addition, the carbon dioxide may originate from dry ice, from the supercritical fluid, or may be extracted from flue gas produced in coal fired power plants. For example, one embodiment, the step of introducing the carbon dioxide is further defined as introducing solid carbon dioxide into the coating composition or into the composition including at least one of the organoborane-amine complex, the radical polymerizable compound, and water prior to forming the coating composition. In another embodiment, a low pressure gas (~1 bar) produced from combustion of coal may serve as a source of the carbon dioxide. In other embodiments, the carbon dioxide is provided from gas tanks that include regulators, as a by-product of an ancillary chemical reaction, as a by-product of a biological process, as a by-product of a manufacturing operation, from a carbon dioxide generator, as a by-product from combustion of natural gas, as a by-product from gasification of coal, as a by-product of various carbon-containing fuel sources, from flue gas streams, such as abatable flue gas streams, or from combinations thereof.

Alternatively, the step of introducing the organoborane-amine complex, the radical polymerizable compound, and water, may be further defined as spraying the organoborane-amine complex, the radical polymerizable compound, and water onto the substrate. In this embodiment, the step of introducing the carbon dioxide is further defined as spraying the carbon dioxide from a nozzle of a spray gun. Also in this embodiment, the step of spraying the carbon dioxide is further defined as shaping the organoborane-amine complex, the radical polymerizable compound, and water with the carbon dioxide as the organoborane-amine complex, the radical polymerizable compound, and water are being sprayed. It is to be appreciated that, within the context of the instant invention, the organoborane-amine complex and the radical polymerizable compound may be sprayed separate from the water, which may originate from sources other than the spray gun.

The carbon dioxide is present in the coating composition in a molar ratio of at least 500:1, alternatively at least 588:1, alternatively from 500:1 to 1765:1, alternatively from 1176:1 to 1765:1 with the amine blocking agent of the organoborane-amine complex. As known in the art, carbonic acid forms in equilibrium with water and carbon dioxide over time, and a hydration equilibrium constant of carbon dioxide in water is $1.7 \times 10^{-3}$ at 25° C. The equilibrium between carbonic acid with water and carbon dioxide can be represented by the following equation:

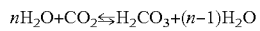

$$nH_2O + CO_2 \leftrightarrows H_2CO_3 + (n-1)H_2O$$

As such, carbonic acid is formed in situ within the coating composition. By "in situ", it is meant that carbonic acid itself is not added directly to the coating composition, but rather forms within the coating composition as a result of introducing carbon dioxide into the coating composition with water also being present in the coating composition. The in situ formation of the carbonic acid enables excellent control of the organoborane decomplexing reaction, and provides many other benefits (including handling, worker safety, etc.) over systems that require an acid to be introduced directly into the coating composition. The carbonic acid is present in the coating composition in a molar ratio of 0.85:1 to amine blocking groups in the organoborane-amine complex when carbon dioxide is present in a molar ratio of 500:1 to amine blocking groups in the organoborane-amine complex at 25° C. (assuming the molar amount of water present in the coating composition is sufficient to stabilize the carbonic acid). However, it is to be appreciated that temperature and/or pressure may be adjusted to shift the equilibrium of carbonic acid with water and carbon dioxide. As such, in accordance with the instant invention, the carbonic acid is formed in a predetermined amount based upon temperature of the coating composition and/or pressure of an atmosphere surrounding the coating composition. "Pre-determined", as used herein, is intended to mean that relative amounts of water and carbon dioxide, as well as the above-mentioned temperature and pressure variables, are set based upon an intended yield of carbonic acid in the coating composition. Typically, the predetermined amount of carbonic acid present in the coating composition is further defined as a molar ratio of at least 1:1, alternatively at least 2:1, alternatively at least 3:1 of carbonic acid to the amine blocking agent of the organoborane-amine complex, which is an amount sufficient to decomplex the organoborane-amine complex as described in further detail below. The carbonic acid is typically formed in the coating composition at atmospheric pressure of about 1 atm and a temperature of from about −78° C. to about 30° C. However, it is to be appreciated that temperatures and pressures at which the carbonic acid is formed may be varied without deviating from the scope of the instant invention.

Equilibrium of carbonic acid with water and carbon dioxide is typically reached over a relatively long period of time. As such, steps may be taken to reduce the time it takes to achieve equilibrium of carbonic acid with water and carbon dioxide in the coating composition for purposes of accelerating polymerization of the radical curable compound in the coating composition. For example, the coating composition may be subjected to increased pressures to increase the solubility of carbon dioxide in the coating composition, and to thereby increase formation of carbonic acid due to the presence of higher amounts of carbon dioxide in the coating composition. Typically, the in situ carbonic acid is formed in the predetermined amount within a period of less than or equal to 60 minutes, more typically from about 5 to about 30 minutes, most typically from about 5 to about 15 minutes.

The organoborane-amine complex is decomplexed or dissociates (i.e., breaks apart) to separate the organoborane initiator and the amine blocking agent, as described above. The organoborane-amine complex is decomplexed in the coating composition via reaction of the carbonic acid in the coating composition with the amine blocking agent. Without intending to be bound by any particular theory, it is believed that the carbonic acid donates a single proton to react with a single amine blocking agent, although it is possible (but unlikely) that small amounts of carbonic acid may donate two protons to react with two amine blocking agents. In particular, it is believed that the carbonic acid donates either one or two protons to water molecules thereby forming acidic species, which in turn react with the amine blocking agent to decomplex the organoborane-amine complex. Accordingly, as set forth above, the carbonic acid is typically present in a molar ratio of at least 1:1 to the amine blocking agent in the organoborane-amine complex, and is more typically present in the amounts or ranges set forth above.

The method may also include the step of introducing a second gas into the coating composition or into the composition including at least one of the organoborane-amine complex, the radical polymerizable compound, and water prior to forming the coating composition. The second gas may be sulfuric anhydride. The second gas may be introduced by any method described above relative to the step of introducing the carbon dioxide. In particular, the second gas may be included in the controlled gaseous atmosphere along with the carbon dioxide. Alternatively, the second gas may be included in an additional controlled gaseous atmosphere, separate from the controlled gaseous atmosphere containing the carbon dioxide as described above. Without intending to be bound by any particular theory, it is believed that the second gas may react with the water via similar mechanisms as the carbon dioxide.

The method also includes the step of polymerizing the radical polymerizable compound using the organoborane initiator in the presence of oxygen. In one embodiment, the step of polymerizing is further defined as polymerizing at a temperature of from −78° C. to 35° C. In another embodiment, the step of polymerizing is further defined as polymerizing at a temperature of from 15° C. to 30° C. In yet another embodiment, the step of polymerizing is further defined as polymerizing at about room temperature. Alternatively, the method may include the step of applying heat and/or radiation to the coating composition and/or radical polymerizable compound to polymerize the radical polymerizable compound. The step of polymerizing the radical polymerizable compound may be further defined as polymerizing to cure the coating composition on the automobile component.

The step of polymerizing using the organoborane initiator in the presence of oxygen can be further defined as polymerizing by free radical polymerization. The mechanism of free radical polymerization is well known in the art and typically includes three stages: initiation, propagation, and termination. Typically, and as described above, a homolytic cleavage reaction occurs between triplet oxygen and the organoborane initiator thereby forming a radical (R•) that is responsible for initiating polymerization. The radical (R•) typically propagates a developing polymer chain through additional homolytic reactions of the radical polymerizable compound and any second, third, or additional radical polymerizable compounds. The termination stage may include coupling wherein two radicals react with each other, forming a single molecule. Alternatively, chain disproportionation may occur wherein two radicals meet and exchange protons.

In one embodiment, the method also includes the step of limiting an amount of oxygen present in the coating composition because it is believed that a presence of oxygen in the coating composition may inhibit radical formation by forming less reactive radical species that inhibit polymerization. Similarly, the method may also include the step of limiting an amount of oxygen introduced to substrate for the same reasons described immediately above. The oxygen is typically present in the coating composition in a molar ratio of from 1:1 to 5:1 with the organoborane initiator. One manner in which the amount of oxygen present in the coating composition may be limited is by limiting the amount of oxygen present in the atmosphere surrounding the coating composition. To these ends, the oxygen may be present in the atmosphere surrounding the coating composition in an amount of from 0.1 to 5.0 percent by weight based on the total weight of the atmosphere surrounding the coating composition.

The total curing time for the coating composition typically varies depending upon the particular nature of the coating composition and the intended use thereof. However, the total curing time for the coating composition is typically less than or equal to 60 minutes, alternatively less than 30 minutes, most typically from about 5 to about 30 minutes.

In one embodiment of the method of the instant invention, the step of decomplexing the organoborane complex occurs in the absence of external heating, such as from an oven. To explain, the carbonic acid naturally forms in the coating composition in the presence of water and carbon dioxide. Once the carbonic acid forms, the carbonic acid donates one or two protons that react with the amine blocking agent in the absence of external heating to decomplex the organoborane-amine complex. Further, the organoborane initiator, after separation from the amine blocking agent, is also reactive with the radical polymerizable compound in the presence of oxygen and in the absence of external heating. Additionally, the step of polymerizing the radical polymerizable compound using the organoborane initiator in the presence of oxygen may occur in the absence of external heating of the coating composition. However, it is to be appreciated that external heating may be employed to polymerize the radical polymerizable compound.

In an alternative embodiment, the method also includes the step of reclaiming at least part of the carbon dioxide used in the method. At least part of the carbon dioxide may be reclaimed through a thermally reversible reaction of the carbonic acid. As set forth above, carbon dioxide has a very low hydration equilibrium constant, with the amount of carbonic acid present in the coating composition dependent upon the amount of water and carbon dioxide present therein. Reductions in the amount of water and/or carbon dioxide in the coating composition result in reductions in the amount of carbonic acid present therein, thereby providing numerous options for reducing the amount of carbonic acid present in the coating composition and/or the cured coating. As such, it is possible to reduce or eliminate the presence of carbonic acid in the cured coating once the organoborane-amine complex is decomplexed. In this manner, harmful affects associated with known acids that are used as decomplexing agents can be avoided or minimized.

The following Examples are intended to illustrate, and not to limit, the scope of the instant invention.

EXAMPLES

Coating compositions are formed and applied to a substrate in accordance with the method described below. Coating Compositions 1 and 2 are formed as follows:

Composition 1 is formed by combining 10.03 grams of Laromer® UA9061, 0.51 grams of tri-n-butylborane diaminopropane (TnBB-DAP) complex as the organoborane-amine complex, and 0.13 grams of water. Laromer® UA9061 is an aliphatic polyurethane acrylate resin and is commercially available from BASF Corporation. The Laromer® UA9061 is included in Composition 1 as the radical polymerizable compound. Notably, no photoinitiators are included in Composition 1.

Composition 2 is formed by combining 9.93 grams of a 1K UV curable clearcoat refinish system, 0.52 grams of triethylborane-1,3-diaminopropane (TEB-DAP) complex as the organoborane-amine complex, and 0.54 grams of water. The 1K UV curable clearcoat refinish system includes Laromer® UA9061 as the radical polymerizable compound. Notably, as with Composition 1, no photoinitiators are included in Composition 2.

After formation, the Coating Compositions are then individually applied to a metal panel that has that has an electrocoat layer formed thereon. After application of the Coating Compositions, each of the Coating Compositions is drawn down with a #8 bar. Subsequently, the coated substrate including Coating Composition 1 disposed therein is placed in a bucket comprising dry ice for a period of about 20 minutes, which is a sufficient amount of time for carbon dioxide in the bucket to diffuse into the Coating Composition 1 in a molar ratio of at least 500:1 with the amine blocking agent of the organoborane-amine complex to thereby form in situ carbonic acid in the Coating Composition 1 and which is also a sufficient amount of time for Coating Composition 1 to cure. After 20 minutes, Coating Composition 1 is evaluated to determine whether observable cure occurs via visual evaluation. The results of the above evaluations indicate that Coating Composition 1 exhibits observable cure.

The coated substrate including Coating Composition 2 disposed therein is placed in a bucket comprising dry ice for a period of about 45 minutes, which is a sufficient amount of time for carbon dioxide in the bucket to diffuse into the Coating Composition 2 in a molar ratio of at least 500:1 with the amine blocking agent of the organoborane-amine complex to thereby form in situ carbonic acid in the Coating Composition 2 and which is also a sufficient amount of time for Coating Composition 2 to cure. After 45 minutes, Coating Composition 2 is evaluated to determine whether observable cure occurs via visual evaluation. The results of the above evaluations indicate that Coating Composition 2 exhibits observable cure.

COMPARATIVE EXAMPLES

Coating Composition 2 is also applied to substrates in the absence of carbon dioxide. More specifically, these substrates are placed in atmospheric air that includes carbon dioxide present in ambient amounts. Once placed in atmospheric air, Coating Composition 2 is allowed to cure for several days. After several days, the Coating Composition 2 is evaluated to determine whether observable cure occurs via visual evaluation. The results of the above evaluations indicate that Coating Composition 2 does not exhibit observable cure when placed in atmospheric air due to insufficient diffusion of carbon dioxide into the Coating Composition 2.

Accordingly, the data set forth above indicate that the method of the instant invention effectively polymerizes radical polymerizable compounds and allows for efficient and effective curing of coating compositions. In addition, the Coating Compositions 1 and 2 cure using carbon dioxide that is non-toxic and is not classified as a hazardous air pollutant, thus making this method environmentally friendly and allowing this method to be utilized in large production facilities with minimal emissions and pollution. In addition, the carbon dioxide is inexpensive and is readily available from recycling efforts designed to reduce greenhouse gasses and environmental pollution. In addition, use of the carbon dioxide minimizes oxygen surface inhibition of curing thereby increasing the efficiency of this method. Moreover, use of the carbon dioxide improves control of curing rate and allows for use of one-component (1K) systems that reduce cure times.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A method of curing a coating composition comprising a radical polymerizable compound and an organoborane-amine complex having an organoborane initiator, an amine blocking agent, and water, said method comprising the steps of:
   A. combining the organoborane-amine complex, the radical polymerizable compound, and water to form the coating composition;
   B. introducing carbon dioxide into the coating composition or into a composition including at least one of the organoborane-amine complex, the radical polymerizable compound, and water prior to forming the coating composition, wherein the carbon dioxide is present in the coating composition in a molar ratio of at least 500:1 with the amine blocking agent of the organoborane-amine complex to thereby form in situ carbonic acid in a predetermined amount based upon temperature of the coating composition and/or pressure of an atmosphere surrounding the coating composition;
   C, decomplexing the organoborane-amine complex with the carbonic acid thereby separating the organoborane initiator and the amine blocking agent; and
   D. polymerizing the radical polymerizable compound using the organoborane initiator in the presence of oxygen.

2. The method as set forth in claim 1, wherein the predetermined amount of carbonic acid is further defined as a molar ratio of at least 1:1 of carbonic acid to the amine blocking agent of the organoborane-amine complex.

3. The method as set forth in claim 1, wherein the carbonic acid is formed at atmospheric pressure of about 1 atm and a temperature of from about −78° C. to about 30° C.

4. The method as set forth in claim 1, wherein the in situ carbonic acid is formed in the predetermined amount within a period of less than or equal to 60 minutes.

5. The method as set forth in claim 1, wherein the step of introducing carbon dioxide comprises exposing the coating composition to a controlled gaseous atmosphere containing carbon dioxide present in a concentration greater than concentration of carbon dioxide in ambient atmospheric air.

6. The method as set forth in claim 1, wherein the step of introducing carbon dioxide comprises introducing supercritical carbon dioxide into the coating composition or into the composition including at least one of the organoborane-amine complex, the radical polymerizable compound, and the water prior to forming the coating composition.

7. The method as set forth in claim 1, wherein the step of introducing carbon dioxide comprises introducing solid carbon dioxide into the coating composition or into the composition including at least one of the organoborane-amine complex, the radical polymerizable compound, and the water prior to forming the coating composition.

8. The method as set forth in claim 1, wherein the step of introducing the carbon dioxide comprises spraying the carbon dioxide from a nozzle of an impingement spray gun.

9. The method as set forth in claim 1, further comprising the step of limiting an amount of oxygen present in the coating composition.

10. The method as set forth in claim 1, wherein the organoborane-amine complex has the following formula:

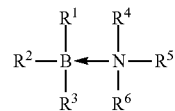

wherein each of $R^1$, $R^2$, $R^3$, $R^4$, $R^5$, and $R^6$ is independently is a hydrogen atom, an alkyl group, an alkoxy group, an arylalkyl group, an alkylene group, halogenated homologs thereof, or combinations thereof.

11. The method as set forth in claim 1, wherein the radical polymerizable compound is selected from the group consisting of unsaturated acrylic ester resins, functional acrylic ester monomers, and combinations thereof.

12. The method as set forth in claim 1, wherein the radical polymerizable compound is present in an amount of from 90 to 97 percent by weight based on the total weight of the coating composition and the organoborane-amine complex is present in an amount of from 2 to 5 percent by weight based on the total weight of the coating composition.

13. The method as set forth in claim 1, wherein the step of decomplexing the organoborane complex occurs in the absence of external heating of the reactive composition.

14. The method as set forth in claim 1, wherein step A) further comprises applying the coating composition onto an automobile component.

15. An automobile component including a cured coating formed thereon according to the method as set forth in claim 14.

* * * * *

UNITED STATES PATENT AND TRADEMARK OFFICE
CERTIFICATE OF CORRECTION

PATENT NO. : 8,653,183 B2
APPLICATION NO. : 13/380255
DATED : February 18, 2014
INVENTOR(S) : Gutowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 44 days.

Signed and Sealed this
Twenty-ninth Day of September, 2015

Michelle K. Lee
*Director of the United States Patent and Trademark Office*